July 29, 1947.  F. RIEBER  2,424,772
SYSTEM FOR DETECTING MAGNETIC MASSES
Filed July 13, 1943  2 Sheets-Sheet 1
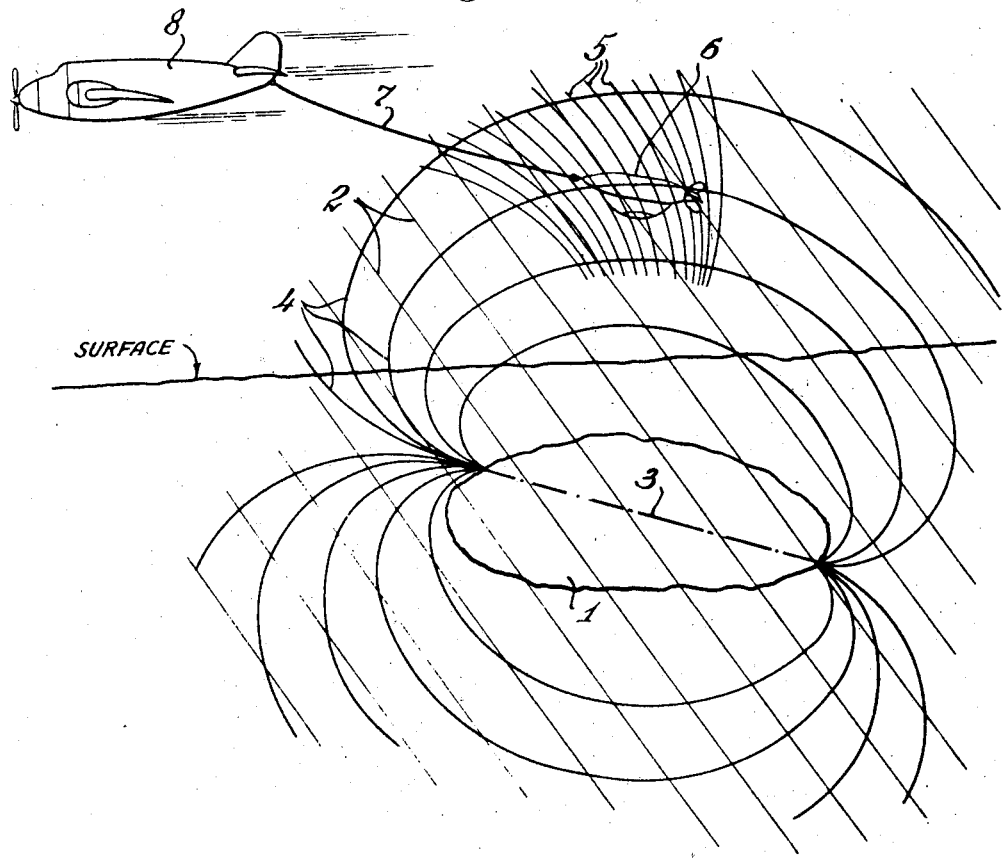
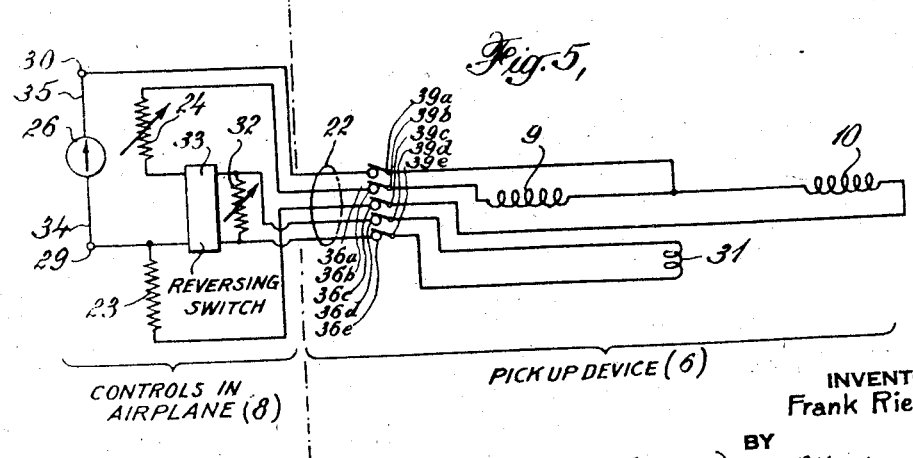
INVENTOR
Frank Rieber
BY
Pennie, Davis, Marvin & Edmonds.
ATTORNEYS July 29, 1947.  F. RIEBER  2,424,772
SYSTEM FOR DETECTING MAGNETIC MASSES
Filed July 13, 1943  2 Sheets-Sheet 2
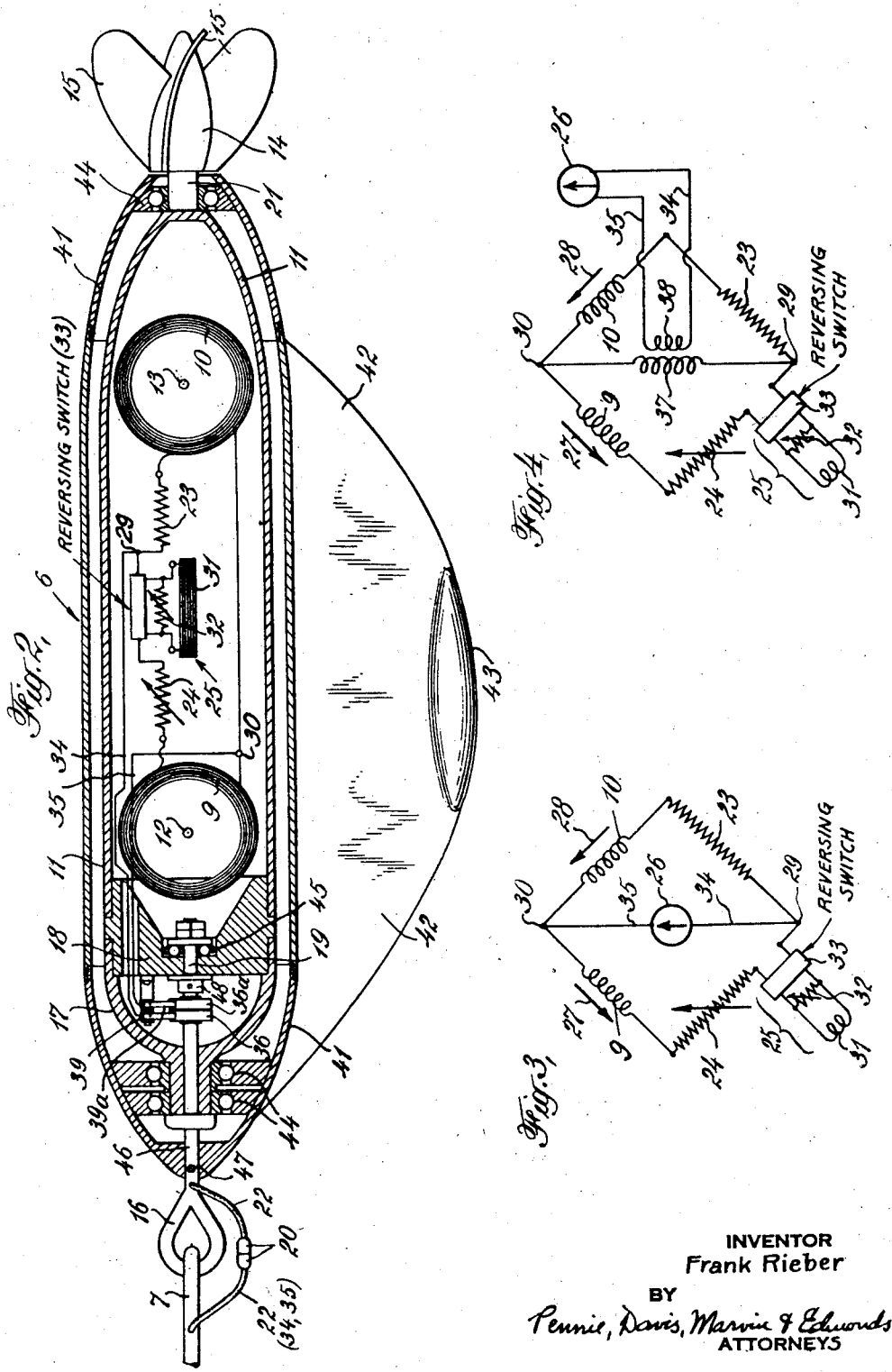
INVENTOR
Frank Rieber
BY
Pennie, Davis, Marvin & Edmonds.
ATTORNEYS Patented July 29, 1947

2,424,772

UNITED STATES PATENT OFFICE 2,424,772

SYSTEM FOR DETECTING MAGNETIC MASSES

Frank Rieber, New York, N. Y., assignor to Interval Instruments, Inc., a corporation of New York Application July 13, 1943, Serial No. 494,472

3 Claims. (Cl. 177—385)

This invention relates to detection and location of magnetic bodies; and especially to a system whereby a large region may be rapidly explored to determine the location of bodies having magnetic properties. For example, masses of iron that are below the earth's surface or below the surface of a body of water, may be readily detected, as well as masses located on or above the earth's surface.

A body of magnetic material, by being subjected to the earth's magnetic field or to other magnetic influence, is magnetized thereby, and in turn operates as a magnet. The intensity of magnetization depends upon the permeability of the body and intensity of the magnetizing influence and this magnetization results in the creation of a magnetic field of greater intensity than the earth's field, in the region neighboring the body.

The variation in the resultant magnetic field neighboring the body may be utilized to affect a sensitive detector responding to resulting changes in the magnetic intensity as the region is explored.

The present invention is an improvement on the previous arrangements which utilized for an exploring device a pair of synchronously rotated coils arranged to generate electromotive forces corresponding to the strength of the field in which they rotated. If these coils were maintained separated by a substantial distance, the differential between the electromotive forces induced in the coils was an indication that the fields operating on the coils were not of the same strength, and this in turn showed that the earth's field was distorted by a magnetic body.

While theoretically such an arrangement may seem to be feasible and readily usable, there are several factors that militate against its practical application. In the first place, the system should be such that only a reasonable separation between the coils is necessary to obtain measurable differences in the induced electromotive forces. Since at best these differences are quite small, it is essential that the coils be in exact phase at all times, and that in a uniform field the generated electromotive forces remain not only exactly in phase but exactly equal.

It is impossible to wind two absolutely identical coils, or to mount them on an absolutely rigid body so that they remain exactly in synchronization and so that their axes are maintained in exact parallelism, which is a requisite to ensure that the electromotive forces are in phase.

One of the advantages of this invention is that it makes possible ready compensation for such physical or structural inaccuracies as result in inequalities in phase and voltage. In this way the pick-up coils may be mounted in an approximately correct position, and then the compensators, as provided by this invention, may be adjusted so that in a uniform field, the coils behave as if they were in exactly balanced position.

Preferably, the pick-up coils are connected in a bridge circuit, so that when they are operating in a uniform field an indicator may be connected to equipotential points of the bridge. Deviations from bridge balance cause corresponding deviations of the indicator from a null position. This invention provides in conjunction with the pick-up coils a bridge circuit which is simple to adjust and reliable in operation.

Additional advantages will be more apparent from a consideration of several embodiments of the invention which will now be described in detail to illustrate the general principles of the invention. It is to be understood that this description is not to be taken in a limiting sense, since the scope of the invention is best defined by the appended claims.

Referring to the drawings:

Fig. 1 illustrates, in general, one manner in which the invention may be put into practice;

Fig. 2 is a diagrammatic view, partly in cross-section, of apparatus incorporating the invention;

Fig. 3 is an electrical wiring diagram of the system;

Fig. 4 is a diagram of a modified form of the invention; and

Fig. 5 is a diagram of the system of Figs. 2 and 3 arranged for remote control.

Referring first to Fig. 1, a mass 1 of magnetic material such as iron or iron ore is shown below the earth's surface. It is to be understood, however, that this mass of magnetic material 1 may be located either above or at the surface of the earth, or above or below the surface of a body of water.

If not already magnetized, the mass 1, being subjected to the earth's magnetic field (shown in general by the substantially parallel lines 2), has magnetism induced in it, making the mass 1 a weak magnet. The strength of the magnetism present or concentration of magnetic flux in the mass 1 depends upon its permeability. For example, the mass or body may be conceived of as having a polar axis 3, and the magnetic field due to the magnetization of the mass may be indicated generally by the curved lines 4. These lines of force 4 neighboring the mass 1 may be considered to create a redistribution or an irregularity in the earth's magnetic field. Lines 5 have been drawn so that each line passes through points of equal magnetic field strength or magnetic potential. Hence, lines 5 do not represent lines of force, but are isopotential lines. As the series of lines 5 progresses toward the left, as viewed in Fig. 1, the field through which they pass becomes more concentrated or stronger. By the aid of this invention, the non-uniformity of the field due to the presence of mass 1 is made perceptible at a considerable distance from the mass.

The invention contemplates the use of a device 6 subjected to a non-uniform magnetic field (indicated by lines 5) and sensitive to differences in the strength of the field in which the pick-up device 6 is moved. This device 6 may be moved about for exploration purposes to any desired area and in any required detecting position. In the present instance it is shown as towed by a line or cable 7 attached to an airplane 8 in flight. By appropriate indicating mechanism located within the plane 8, the passage of the pick-up device 6 through a non-uniform magnetic field causes an indicator to operate, as for example by the deflection of a pointer of a delicate galvanometer. When this occurs, it is known that the device 6 is passing in the vicinity of an unseen mass or body 1.

The pick-up device 6 is shown in detail in Fig. 2. It is so arranged that even relatively slight variations from uniformity in the magnetic potential of the resultant field resulting from field 4 (represented by the lines 5), are readily perceptible. Since the strength of the earth's magnetic field is at best quite minute, and the corresponding induced field represented by lines 4 is probably weaker, the detecting apparatus incorporated in the device 6 must be made highly sensitive to small deviations in magnetic field strength.

The important elements of the device 6 comprise a pair of pick-up coils 9 and 10 which are spaced a substantial distance apart—of the order of a number of feet. These coils may be wound with a relatively large number of turns and should be made as nearly identical as conditions permit. Both of them are so supported within a tubular body 11 as to bring their axes 12 and 13 in as close parallelism as possible. The tubular body 11 is constructed so as to be a very rigid support for the coils 9 and 10, and is made of some non-magnetic material. The attachment of the coils 9 and 10 to the interior of the walls of the body 11 may be in any manner desired, so long as the mounting in the body is quite rigid.

The body 11 is rotated on an axis perpendicular to the coil axes 12 and 13 so as to cause the coils 9 and 10 to cut the lines of force in the resultant magnetic field to be detected.

Assuming electrical identity of coils 9 and 10 and exact parallelism of the axes 12 and 13, then the electromotive forces generated by rotation of these coils will be exactly the same when the coils are disposed in a uniform magnetic field. If, however, due to their separation in space, these coils are disposed in fields that are not of the same concentration or strength, then the electromotive forces generated are unequal. As indicated in Fig. 1, the operation of the device 6 depends upon the fact that the coils 9 and 10 operate in fields or portions of a field of different strengths or magnetic potentials. The difference of potential generated in the two coils is proportional to the difference of magnetic potential of the field between them.

By virtue of the fact that the coils 9 and 10 are supported by the aid of a common rigid body 11, maintenance of substantial accuracy of mechanical alignment of the axes 12 and 13 of coils 9 and 10 is simplified; and once the substantial parallelism is attained there is no tendency for the axes to be displaced angularly with respect to each other.

Surrounding tubular body 11 is a tubular casing 41 spaced from body 11, as shown in Fig. 2. At either end, body 11 is supported in casing 41 by suitable ball bearings 44. At the tail end, body 11 terminates in a tail shaft 21 to which a hub 14 is attached and shaped so as effectively to continue the streamlining of casing 41. Around this hub suitable vanes or propeller blades 15 are secured. Attached to and appended below casing 41 is a vertical stabilizing fin 42 having at the bottom thereof a streamlined fin weight or keel, the purpose of which is to prevent whipping or diving of the device 6 as it is being towed. Tow line 7 is attached to the device 6 by an eye bolt 16 having a shaft 46 which is pinned by pin 47 to the nose of casing 41. This shaft is attached by coupling 48 to a short shaft 19 which passes through thrust standard 18 and terminates in thrust bearing 45. Thus when device 6 is towed rapidly through the air, body 11, together with its contents, is rotated within casing 41 by the air stream passing blades 15, the casing being maintained in a substantially fixed vertical position by means of fin 42 and weight 43.

It will be observed that shaft 46 is hollow to accommodate an electric conductor cable 22 which terminates at slip rings 36 and 36a insulated from and secured to shaft 46, as shown. Access to slip rings 36 and 36a, and their respective brushes 39 and 39a may be had by removal of dome cap 17. Electric cable 22 may continue through a separable connector 20 to the airplane 8. For this purpose it is convenient to incorporate the electric cable conductors in the tow-line 7. From brushes 39 and 39a connecting leads 34 and 35 continue to suitable points on the bridge circuit described below.

In order that there be no magnetic disturbances, all of the parts making up the device 6 should be made of non-magnetic materials, such, for example, as brass, copper or a plastic compound. The bearing surfaces may be of beryllium-copper alloy, for example.

It is readily appreciated that even with the greatest care it is impossible to make coils 9 and 10 of exactly equal electrical characteristics, and it is usually not possible to align the axes 12 and 13 so as to be in exact parallelism. Accordingly, coils 9 and 10 are arranged in a circuit in such manner that the inaccuracies are effectively and simply compensated for. For example, as illustrated in Fig. 3, coils 9 and 10 are included as two arms of a bridge circuit. One of the other two arms is formed by a resistance 23, shown in this instance as non-adjustable, although it may be adjustable if desired. The fourth arm of the bridge is formed by a variable or adjustable resistance 24 in series with a compensating circuit 25. The structure and function of this compensating circuit will be described hereinafter. Across a diagonal of the bridge is connected an indicator 26 which may be a delicate galvanometer, or other suitable device. The circuit is so adjusted that this indicator 26 gives a null indication when the coils 9 and 10 are disposed in a uniform magnetic field. When the indicator 26 is connected as illustrated in the figure, the coils 9 and 10 are so connected that their electromotive forces are in the direction of the arrows 27 and 28. Under such circumstances the diagonally opposite points 29 and 30, when the bridge is balanced, will be equipotential. This occurs when coils 9 and 10 are in a uniform magnetic field. When the coils 9 and 10 are in a field which is non-uniform, so that the field affecting one coil is stronger than that affecting the other of coils 9 and 10, the indicator 26 will deflect to one or the other side of null indication.

The compensating system includes means for compensating both in sense and degree for failure to obtain exact phase relationship between the coils 9 and 10 (which may be occasioned by non-parallelism of the axes 12 and 13); as well as means for compensating for inequality of electrical characteristics of the coils, which may result in a larger electromotive force being generated in one coil than in the other when they are both subjected to the same magnetic field intensity.

For phase compensation resulting from lack of parallelism of the coils, a compensating coil 31 is fixedly supported within the body 11 and is bridged by the variable resistance 32. The shape of coil 31 is similar to that of coils 9 and 10, and its axis is transverse with respect to the axes 12 and 13, in this instance being shown to be perpendicular to those axes. Also, coil 31 should be disposed symmetrically with respect to coils 9 and 10. Accordingly it will generate, due to the rotation of the body 11, an electromotive force substantially 90° out of phase with the electromotive forces generated in coils 9 and 10. The extent of the phase compensation may be adjusted by adjusting resistance 32 so as to adjust the length of the 90° vector representing the electromotive force generated in coil 31. Since phase compensation may be desired in either direction or sense, a reversing switch 33 is included in compensating circuit 25, in series in the bridge arm which includes adjustable resistance 24.

To compensate for inequalities of electrical characteristics of the coils 9 and 10 themselves, bridge arm resistance 24 (or 23) is made adjustable.

In adjusting the apparatus, the body 11 is rotated in a carefully protected field known to be uniform. Then resistance 24 and resistance 32 are adjusted until indicator 26 reaches a null position.

In the form illustrated in Fig. 2, the elements 31 and 32 constituting the compensating circuit 25 are located within the body 11. Also, the resistances 23 and 24 are shown supported within the body 11, it being understood that indicator 26 is mounted in the airplane 8. Leads 34 and 35 serving as connections to indicator 26 may be brought through electric cable 22 to collector rings 36 and 36a. These collector rings cooperate with brushes 39 and 39a, respectively, which are connected to conjugate points 29 and 30 of the bridge, Fig. 3. The material of the collector rings and the brushes may be so chosen as to create and carry minimum disturbances; for example, the brushes may be made of a composition of silver and graphite, and the collector rings may be made of copper.

In order to avoid the necessity of utilizing the brushes and collector rings just described, which in some instances may interfere with extreme accuracy of balance, other means of connecting the indicator 26 may be provided. For example, in the modified form illustrated in Fig. 4, a primary coil 37 is connected in place of the indicator 26. This primary coil may be fastened to standard 18, for example, and should be so arranged that its axis corresponds to the axis of rotation of body 11. Wound around this primary, but with slight clearance therefrom is a secondary coil 38 adapted to be connected to the indicator. Coil 38 is stationary and therefore would be fixed to shaft 46. Since coils 37 and 38 have a common axis, rotation of either of these coils about the common axis has no inducing effect, and the transformer behaves as if both coils were stationary. Accordingly, the leads of coil 38 may be directly connected to the galvanometer without using any collector rings.

For practical purposes it is frequently preferable to locate the adjustable elements of the bridge circuit outside of the body 11, where they may be adjacent the indicator for remote control. Such a system is illustrated in Fig. 5. The system of Fig. 5 is electrically identical with that of Figs. 2 and 3, the only difference being the rearrangement permitting control of the adjustable elements, during use, if required. (Like reference characters denote like components in all of the figures.) In this case the leads from the coils 9, 10, and 31 may be connected, as in Fig. 2, through appropriate brushes and collector rings represented by reference characters 36a to 36e and 39a to 39e, respectively. A five-conductor cable 22 may then continue by way of the tow line 7 to the airplane 8, as shown in Figs. 1 and 2.

If, in locating magnetic bodies or masses in accordance with this invention, the pick-up device 6 be towed behind an airplane or other aircraft, large regions or areas of land or water may be explored in a comparatively short time. It will, of course, be evident that the device 6 may be constructed to be waterproof so as to be adapted to towing in the water behind a ship, if desired. As a matter of fact it is preferable that the device be made waterproof even if it is to be used only in the air. When the pick-up device 6 passes near enough to a magnetic mass or body to generate a measurable potential at the indicator, the indicator will usually give two deflections in rapid succession, first in one direction and then in the other direction. These two deflections may appear merely as a "flicker" of the meter pointer if the pick-up device is moving rapidly and the magnetic mass is small. Upon observing such deflection the operator may mark the location by dropping a smoke bomb, flare or other suitable marking device, and may return to cross the location from different directions to mark the spot more definitely, or more slowly moving craft may follow to explore the marked area with similar magnetic pick-up devices, or with different locating means.

It will be apparent that, instead of towing the pickup device 6 at the end of a tow line as described, it may be secured to the exterior of the craft which carries it, so that the passing air or water can rotate the propeller blades 15. Alternatively, an electrically similar pickup device can be arranged within the craft (in the tail of an airplane, for instance) rotated by an independent prime mover while the craft "covers" the required region. In either arrangement the control apparatus (represented at the left of the dash-dot line in Fig. 5) may be remote in that it is not contained within the device 6, but it need be located only a short distance away in the same craft, under the constant control of an operator. However, for maximum sensitivity it is usually necessary that the pickup device be spaced some distance from the craft which carries or moves it.

I claim:

1. In an apparatus for indicating differentials of intensity in the magnetic field in a given region, a casing rotatable about a longitudinal axis, and means for rotating the same, a pair of similar coils spaced apart from each other and fixed within said casing and having their axes parallel to each other and transverse to the axis of said casing, and being connected together, a bridge circuit carried by and within said casing, of which said coils form two of the arms, and having two other arms, a third coil carried within said casing remotely and symmetrically spaced from said first mentioned coils and mounted with its axis at right angles to the axis of said first mentioned coils, and to the axis of said casing, said third coil being bridged across an adjustable portion of one of the arms of said bridge to adjust the phase displacement therein, a non-rotatable stem within said casing, and connections through said stem to diagonally opposite points on said bridge.

2. In an apparatus for indicating differentials of intensity in the magnetic field in a given region, a casing rotatable about a longitudinal axis, and means for rotating the same, a pair of similar coils spaced apart from each other and fixed within said casing and having their axes parallel to each other and transverse to the axis of said casing, and being connected together, a bridge circuit carried by and within said casing, of which said coils form two of the arms, and having two other arms, a third coil carried within said casing remotely and symmetrically spaced from said first mentioned coils and mounted with its axis at right angles to the axis of said first mentioned coils, and to the axis of said casing, said third coil being bridged across an adjustable portion of one of the arms of said bridge to adjust the phase displacement therein, a non-rotatable stem within said casing, and connections through said stem to the mid-point between said coils and to the diagonally opposite corner of said bridge.

3. A casing rotatable about an axis and means for rotating the same, a pair of similar coils fixed within said casing, having their axes transverse to the axis of the casing and parallel to and spaced from each other, said coils being connected together in series, a compensating coil fixed within said casing midway between said first mentioned coils and having its axis transverse to the axes of said coils and to the axis of said casing, a bridge circuit of which said first mentioned coils form arms and having two other arms, said compensating coil being connected across an adjustable portion of one of said bridge arms.

FRANK RIEBER.

REFERENCES CITED

The following references are of record in the file of this patent:

UNITED STATES PATENTS

| Number | Name | Date |
| --- | --- | --- |
| 1,378,960 | Horton | May 24, 1921 |
| 1,574,074 | Fessenden | Feb. 23, 1926 |
| 1,812,392 | Zuschlag | June 30, 1931 |

FOREIGN PATENTS

| Number | Country | Date |
| --- | --- | --- |
| 130,350 | Great Britain | Aug. 7, 1919 |
| 368,006 | Great Britain | Sept. 25, 1931 |